(12) United States Patent
Piirainen

(10) Patent No.: US 7,546,105 B2
(45) Date of Patent: Jun. 9, 2009

(54) INTERFERENCE REJECTION IN RADIO RECEIVER

(75) Inventor: Olli Piirainen, Oulu (FI)

(73) Assignee: Nokia Corporation, Espoo (FI)

( * ) Notice: Subject to any disclaimer, the term of this patent is extended or adjusted under 35 U.S.C. 154(b) by 463 days.

(21) Appl. No.: 11/359,524

(22) Filed: Feb. 23, 2006

(65) Prior Publication Data

US 2007/0155354 A1 Jul. 5, 2007

(30) Foreign Application Priority Data

Dec. 29, 2005 (FI) .................................. 20055711

(51) Int. Cl.
*H04B 1/06* (2006.01)
*H04B 1/10* (2006.01)

(52) U.S. Cl. ................ 455/278.1; 455/63.1; 455/67.13; 455/296; 375/346; 375/350

(58) Field of Classification Search ................ 455/63.1, 455/67.11, 67.13, 278.1, 295, 296, 307; 375/346, 375/348, 350
See application file for complete search history.

(56) References Cited

U.S. PATENT DOCUMENTS 5,005,188 A * 4/1991 Clark .......................... 375/348
6,035,003 A * 3/2000 Park et al. .................... 375/326
6,771,723 B1 8/2004 Davis
6,934,346 B2 * 8/2005 Lindoff et al. ............... 375/350
7,107,031 B2 * 9/2006 Kristensson et al. ........ 455/296
2004/0259514 A1 12/2004 Nissila
2005/0101279 A1 5/2005 Lee

FOREIGN PATENT DOCUMENTS

WO        WO 00/64061         10/2000

OTHER PUBLICATIONS

Tsai, Shiauhe et al., "*DS-CDMA System with Joint Channel Estimation and MAP Detection in Time-Selective Fading Channels*", IEE Journal on Selected Areas in Communication, vol. 19, No. 1, Jan. 2001, pp. 121-131.
International Search Report PCT/FI2006/050582 filed Dec. 22, 2006.

* cited by examiner

*Primary Examiner*—Quochien B Vuong
(74) *Attorney, Agent, or Firm*—Squire, Sanders & Dempsey L.L.P.

(57) ABSTRACT

The invention relates to interference cancellation in a receiver in a radio system. The receiver receives at least two input data signals, and extracts an interference estimate signal specific to each input data signal. An interference estimate signal covariance matrix is calculated, and autoregressive parameters and covariance parameters are estimated from the covariance matrix. Interference is canceled from the at least two input data signals by finite impulse response filters using the estimated parameters as filter coefficients in the finite impulse response filters.

19 Claims, 3 Drawing Sheets

INTERFERENCE REJECTION IN RADIO RECEIVER

FIELD

The invention relates to interference rejection in a radio receiver.

BACKGROUND

The GSM (Global System for Mobile Communication) system is one example of a TDMA (Time Division Multiple Access) radio system, where data transmissions to users are separated from each other in time (also in frequency, FDMA). User transmission is carried out in data bursts, wherein each burst contains user data and a training sequence in the middle of the burst. The training sequence is a sequence of bits known by a receiver. By using the training sequence, the receiver can, in a channel estimation process, determine the position of the actual user data (useful signal) in the burst and also determine the distortion caused by the transmission.

Received signal quality also deteriorates due to interference, which includes multiple access interference (MAI) caused by other users, thermal noise and interference caused by the signal itself due to multi-path propagation. Antenna array techniques have been applied so as to benefit from space diversity at the receiver.

MRC (Maximum Ratio Combining) is one way to combat the interference in the receiver. In MRC, the aim is to maximize the combination signal-to-interference ratio from signals received via several antenna branches. MRC is an optimum strategy when the interference is uncorrelated between the antennas. This is, however, seldom the case in real wireless cellular systems and thus IRC, assuming the presence of interference, gives generally better performance.

There still exists room for improvement for the performance of current IRC receivers.

SUMMARY

It is thus an object of the invention to provide an improved radio receiver that applies interference rejection combining. An object of the invention is to make the received colored noise white by keeping the number of estimation parameters at a reasonable level.

In one aspect of the invention there is provided an interference cancellation unit for a receiver in a communication system, comprising means for receiving at least two input data signals, means for extracting an interference estimate signal specific to each input data signal, means for forming an interference estimate signal covariance matrix, means for estimating, from the covariance matrix, autoregressive parameters of each interference estimate signal with regard to itself and to other interference estimate signals, and covariance parameters between the interference estimate signals, and means for canceling interference from the at least two input data signals by finite impulse response filters using the estimated parameters as filter coefficients in the finite impulse response filters.

In another aspect of the invention there is provided an interference cancellation method in a radio receiver, comprising steps of receiving at least two input data signals, extracting an interference estimate signal specific to each input data signal, forming an interference estimate signal covariance matrix, estimating, from the covariance matrix, autoregressive parameters of each interference estimate signal with regard to itself and to other interference estimate signals, and covariance parameters between the interference signals, and canceling interference from the at least two input data signals by finite impulse response filters using the estimated parameters as filter coefficients in the finite impulse response filters.

In still another aspect of the invention there is provided a computer program product encoding a computer program of instructions for executing a computer process for canceling interference in a radio receiver, the process comprising steps of receiving at least two input data signals, extracting an interference estimate signal specific to each input data signal, forming an interference estimate signal covariance matrix, estimating, from the covariance matrix, autoregressive parameters of each interference estimate signal with regard to itself and to other interference estimate signals, and covariance parameters between the interference estimate signals, and canceling interference from the at least two input data signals by finite impulse response filters using the estimated parameters as filter coefficients in the finite impulse response filters.

In one aspect of the invention there is provided a computer program distribution medium readable by a computer and encoding a computer program of instructions for canceling interference in a radio receiver, the process comprising steps of receiving at least two input data signals, extracting an interference estimate signal specific to each input data signal, forming an interference estimate signal covariance matrix, estimating, from the covariance matrix, autoregressive parameters of each interference estimate signal with regard to itself and to other interference estimate signals, and covariance parameters between the interference estimate signals, and canceling interference from the at least two input data signals by finite impulse response filters using the estimated parameters as filter coefficients in the finite impulse response filters.

The receiver according to the invention is applicable to TDMA, FDMA and OFDM (Orthogonal Frequency Division Multiplexing) systems. One example of a radio system, to which the invention may be applied, is GSM applying TDMA and FDMA. In the receiver, such as a mobile phone or a base station, there are at least two input data streams, either obtained by antenna diversity or over-sampling. The received data may contain pilot symbols for making a channel estimate at the receiver.

An autoregressive model is introduced for estimating the autoregressive properties of the at least two input data signals, that is, interference estimate signals. The model takes white noise as input and estimates model parameters such that the model output parameters are as close as possible to the interference estimate signals. When the model parameters have been found, the interference can directly be cancelled by using the coefficients provided by the model in the estimation procedure. The advantage with the invention is that the number of parameters to estimate is low. Additionally, the performance of a receiver according to the invention prevails over known solutions.

DRAWINGS

In the following, the invention will be described in greater detail by means of preferred embodiments with reference to the accompanying drawings, in which FIG. 1 shows one embodiment of a receiver;

FIG. 2 highlights one embodiment of an autoregressive model applied to multiple input data signals;

EMBODIMENTS

In the following, some embodiments according to the invention will be disclosed in more detail.

Figure 1:
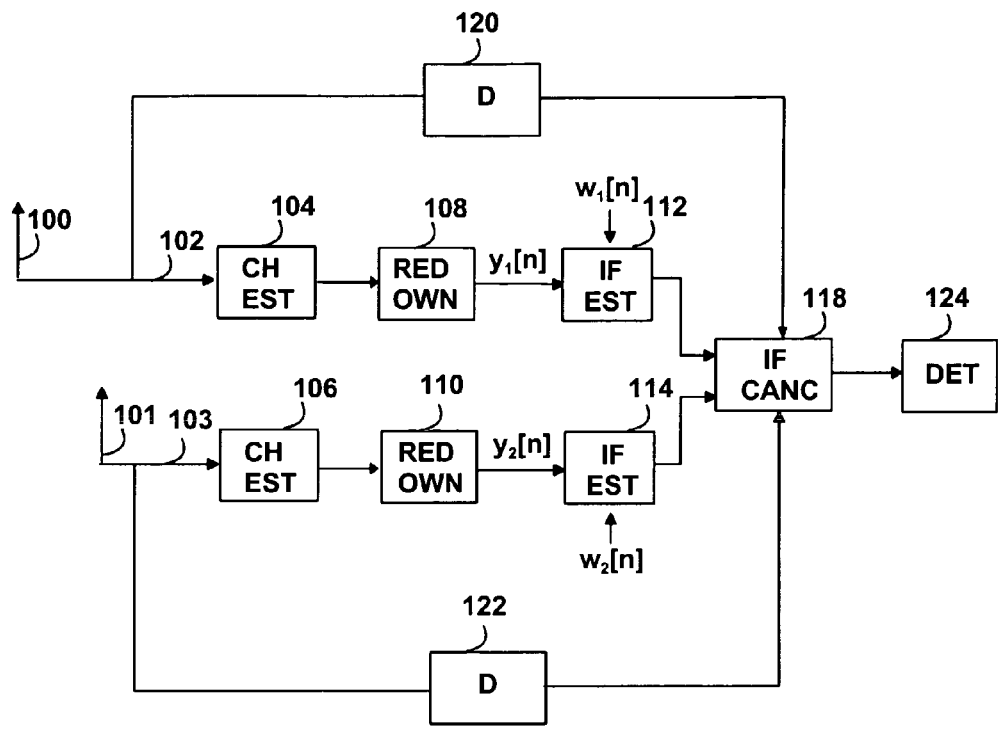

Reference is made to FIG. 1, which shows one embodiment of an IRC receiver. The signal is received via two signal paths 102 and 103. The signal paths may represent signals received via two respective receive antennas 100 and 102. Alternatively, the signal paths may represent signal paths obtained by over-sampling, that is, the actual signal is received by one receive antenna, but the sampling rate at the receiver is double to the transmit symbol rate. The samples may alternately be directed to the first signal path 102 and to the second signal path 103. The two signal paths in FIG. 1 have only been shown as an example and there can be more than two signal paths in the receiver.

The signal path-specific channel estimates are formed in channel estimators 104 and 106. The channel estimates may be formed by applying pilot symbols known to the receiver, and which are present in the received data bursts. By applying the formed channel estimates, the desired signal, may be reduced in reduction elements 108, 110 from the received signals, whereby the interference estimate signals $y_1[n]$ and $Y_2[n]$ are obtained.

The interference cancellation parameters are estimated in estimation blocks 112, 114. One object of the estimation is to provide a model suitable for the subsequently following interference cancellation. Another object of the estimation is to find such parameters that fit best to the selected interference signal model.

In one embodiment, the estimation is made by a model, which takes white noise signals $W_1[n]$ and $W_2[n]$ as input signals and provides the interference estimate signals as output. The estimated model parameters may then be directly used as output parameters of the interference estimation blocks 112 and 114.

The actual interference cancellation is carried out in an interference cancellation block 118. The interference cancellation block 118 takes as input signals the original input data signals, received via separate receive antennas or obtained by over-sampling. Additionally, the estimation blocks 112 and 114 provide the interference cancellation block 118 with the interference cancellation parameters.

After the interference cancellation carried out in block 118, the actual user data detection around the pilot symbols may be carried out in a user data detection block 124.

Figure 2:
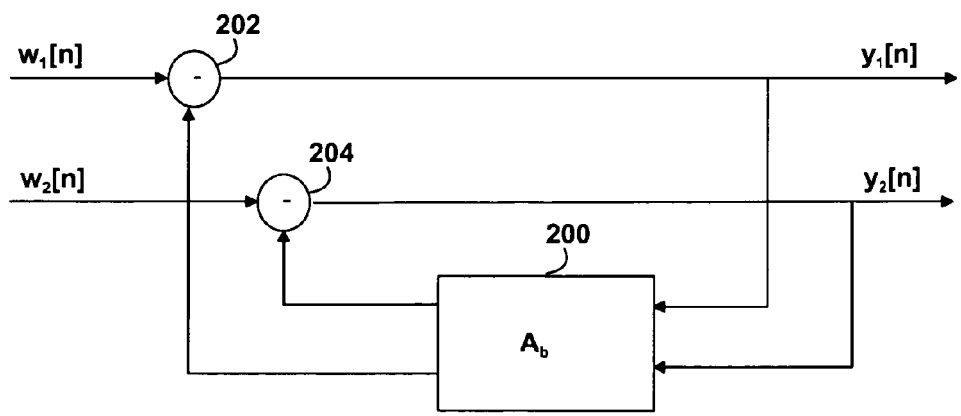

FIG. 2 shows one embodiment of the interference estimation block, such as blocks 112 and 114 in FIG. 1. FIG. 2 shows an autoregressive model (AR) for two input data branches. The input data branches $w_j[n]$ denote Gaussian white noise terms at time instant n. The input data is conveyed to the process $A_b$ so as to produce the interference input signals $y_1[n]$ and $y_2[n]$ as the output of the model. The aim in the model of FIG. 2 is to find a process $A_b$ 200 that has similar correlation properties as the interference.

Generally, a channel model may be written as (1):

$$y = Hx + n, \text{ wherein} \quad (1)$$

y is the received signal vector
H is the channel estimate convolution matrix
x is the transmitted symbol vector, and
n is the noise vector.

By applying maximum likelihood estimation, the problem is to find $\bar{x}$ such that equation (2) is maximized.

$$P\langle y|H,x\rangle = \frac{1}{\pi^N \det(R)} \exp[-(y-Hx)^H R^{-1}(y-Hx)], \quad (2)$$

wherein $R^{-1}$ is an inverse of the correlation matrix R and N is the length of the vector y or size of the N*N correlation matrix. The correlation matrix shows the correlation between the input data signals. Equalizer algorithms are typically derived for diagonal correlation matrix and the purpose of IRC is to diagonalize the matrix.

One way to try to maximize the probability in (2) is to apply the Cholesky method in solving the inverse correlation matrix, but this easily leads to calculations where a great number of parameters have to be determined, which degrades the IRC performance.

The samples of each data branch $y_j$ in FIG. 2 can be temporally correlated. We can write an AR model jointly for all signals:

$$y_j[n] = w_j[n] - \sum_{i=1}^{N} y_1[n-i]a_{1j}[i] - \ldots - \sum y_k[n-i]a_{kj}[i], \quad (3)$$

wherein $a_{jk}$ elements denote autoregressive filter coefficients between $j^{th}$ and $k^{th}$ data branches.

Thus, each sample in each branch is analyzed together with the previous samples in the same branch and in the one or more neighboring branches. The shown calculations are carried out in nodes 202 and 204.

The filter coefficients can be written in a k*k matrix (4), wherein k is the number of interference input signals.

$$A_i = \begin{bmatrix} a_{11} & a_{12} & \ldots & a_{1k} \\ a_{21} & a_{22} & \ldots & a_{2k} \\ \ldots & \ldots & \ldots & \ldots \\ a_{k1} & a_{k2} & \ldots & a_{kk} \end{bmatrix} \quad (4)$$

Equation (3) can be written, by using matrices, in form:

$$y[n] = w[n] - [y[n-1]y[n-2] \ldots y[n-N]] \begin{bmatrix} A_1 \\ A_2 \\ \ldots \\ A_N \end{bmatrix} \quad (5)$$

where each term $A_i$ is a k*k matrix. Thus, in our example of two input data streams, we obtain two matrices, each having size 2*2. Equation (5) can also be expressed as $$w[n] = [y[n]y[n-1] \ldots y[n-N]] \begin{bmatrix} I \\ A_1 \\ \ldots \\ A_N \end{bmatrix} \quad (6)$$

Now, the squared Frobenius norm of the matrix difference can be minimized and we get $$\begin{bmatrix} y^H[n] \\ y^H[n-1] \\ \dots \\ y^H[n-N] \end{bmatrix} w[n] = \begin{bmatrix} y^H[n] \\ y^H[n-1] \\ \dots \\ y^H[n-N] \end{bmatrix} [y[n]y[n-1] \dots y[n-N]] \begin{bmatrix} I \\ A_1 \\ \dots \\ A_N \end{bmatrix} \quad (7)$$

The previous formulations assume that the interference is white over the input dimensions as is the situation in FIG. 2. In equation (7), this is highlighted by the unit matrix I. In practice, the interference may not be white, however, and correlation between data branches may be included to the model.

Figure 3:
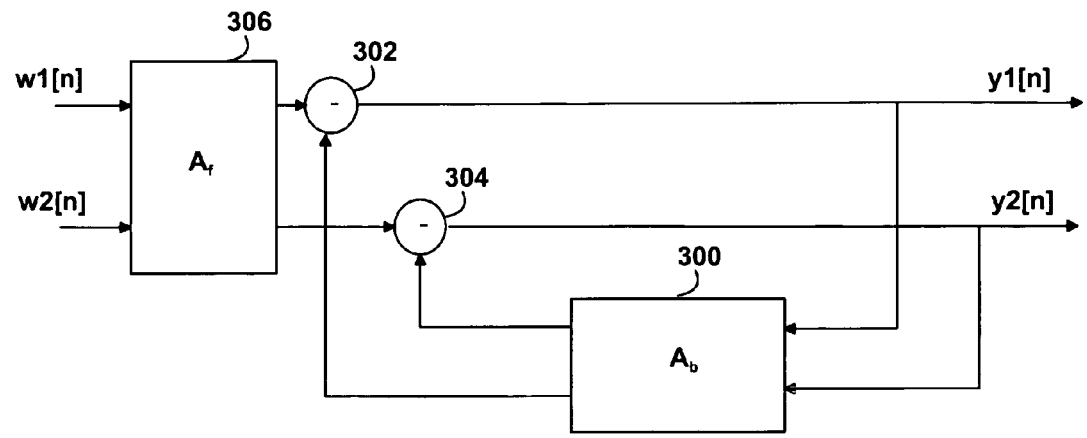
FIG. 3 shows another model for the estimation of interference in a receiver.

FIG. 3 shows another embodiment of a model for estimating the interference in the system. FIG. 3 takes into account the situation that the interference may be colored. There are two sub-models shown in FIG. 3. The feed forward model, $A_f$, 306, models the spatial correlation between the branches, and the feed back model $A_b$, 300 models the autoregressive properties of the signals, that is, a correlation between a sample and previous samples received on the same signal path and samples received in previous time instances on one or more neighboring signal paths. The shown models may estimate the covariance and autoregressive parameters simultaneously.

The spatial correlation properties can be taken into account by replacing the fixed identity matrix I by $A_f$, and we get $$\begin{bmatrix} A_f \\ 0 \\ \dots \\ 0 \end{bmatrix} = \begin{bmatrix} y^H[n] \\ y^H[n-1] \\ \dots \\ y^H[n-N] \end{bmatrix} w[n]$$

$$= \begin{bmatrix} y^H[n] \\ y^H[n-1] \\ \dots \\ y^H[n-N] \end{bmatrix} [y[n]y[n-1] \dots y[n-N]] \begin{bmatrix} I \\ A_1 \\ \dots \\ A_N \end{bmatrix} \quad (8)$$

A matrix R can be defined as shown by (9):

$$R = E \left\{ \begin{bmatrix} y^H[n] \\ y^H[n-1] \\ \dots \\ y^H[n-N] \end{bmatrix} [y[n]y[n-1] \dots y[n-N]] \right\}, \quad (9)$$

wherein E denotes expectation value. Equation (9) can be written in form (10)

$$R = [R_1, R_2], \text{ where} \quad (10)$$

$R_1$ is the first column in R and $R_2$ incorporates the rest in R. Solving $R_1$ gives (11)

$$R_1 = [I \quad -R_2]_1 \begin{bmatrix} A_f \\ A_1 \\ \dots \\ A_N \end{bmatrix}, \quad (11)$$

which is a linear problem where all matrices A can easily be solved.

The parameters obtained from the AR model may be directly taken as filter coefficients for the FIR filters as such so as to cancel the interference modeled by the AR model. Thus, by estimating the interference estimate signals by using an AR model, the model parameters can be applied in canceling of the interference, that is, the whitening of the interference estimate signals.

Figure 4:
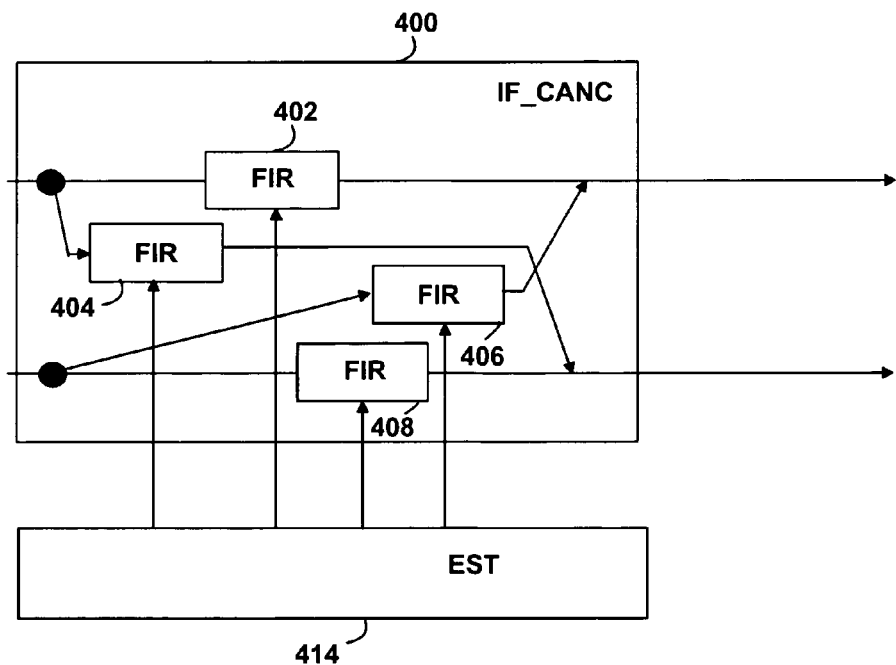
FIG. 4 shows one embodiment of interference cancellation at the receiver.

FIG. 4 highlights one embodiment of an interference cancellation unit according to the invention. The data signals(s) received by the receiver are inputted to the unit 400 with a delay so that the receiver has time to perform an estimation of the interference. Additionally, the interference cancellation 400 receives the estimated interference cancellation parameters from the estimation unit 414.

IF_CANC 400 utilizes the parameters provided by the autoregressive model $A_b$ and the covariance model $A_f$. These models give the filter coefficients to the FIR filters 402 to 408. The filter coefficients denote the amplitude and delay of the filtering operation. Usually, the two most significant filter taps per filter may be enough. If the AR model has two input data signals, the estimation gives four 2*2 matrices. Of each matrix, the (1,1) element may be taken as filter coefficients to the filter 402. Matrix elements (1, 2) may be taken as coefficients to filter 404, matrix elements (2,1) to filter 406 and elements (2, 2) to filter 408. By placing the FIR filters 404 and 406 across the data paths, the correlation between the interference signal estimates may be cancelled.

With regard to the feed-forward cancellation, which refers to $A_f$ in FIG. 3, the interference cancellation may be performed by Chol $A_f^{-1}$, which is included in the filter coefficients of the FIR filters.

Figure 5:
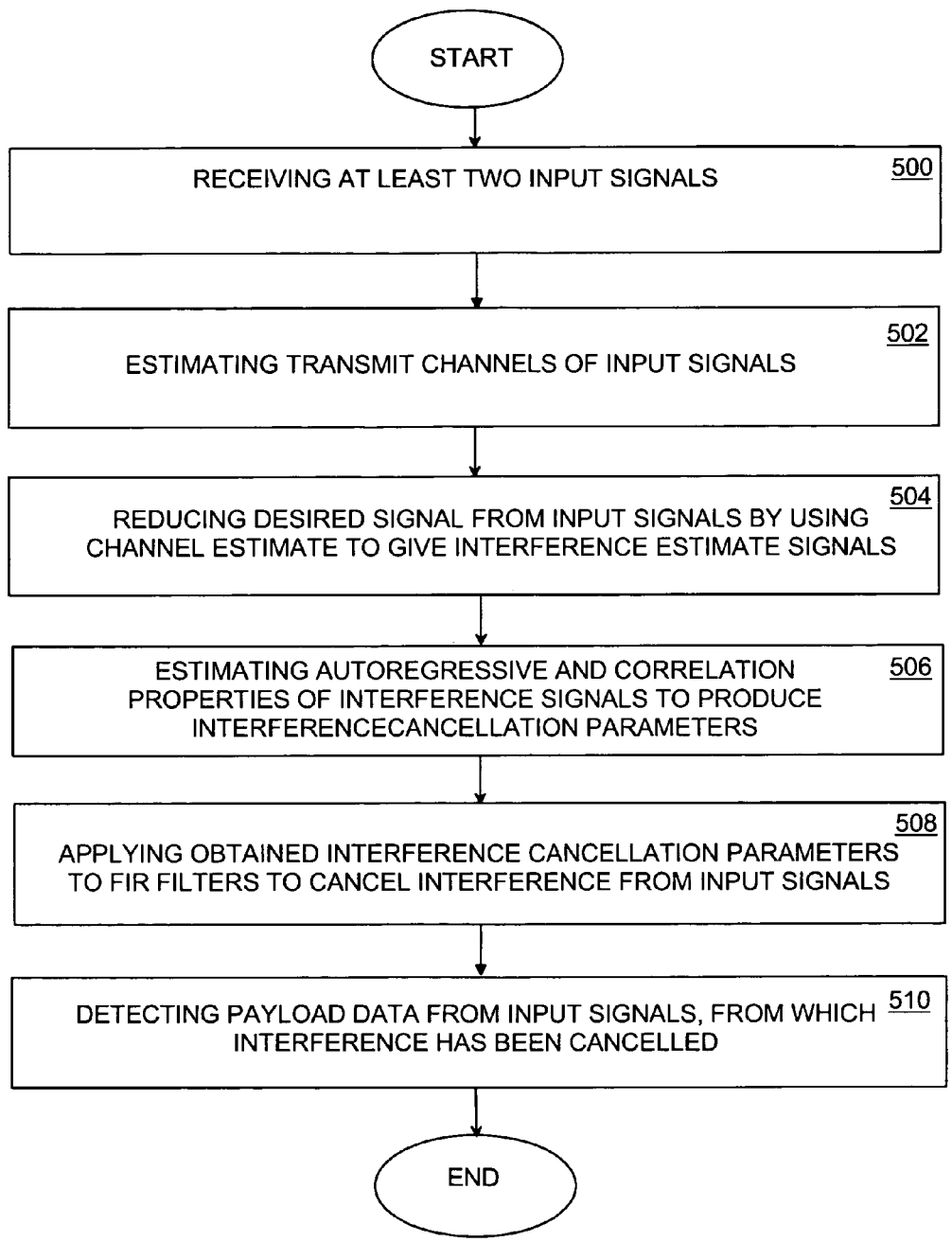
FIG. 5 shows one embodiment of the method according to the invention.

FIG. 5 shows one embodiment of the method according to the invention. In 500, at least two input signals are received in a radio receiver. The input signals may be instances of the same transmit signal. In one embodiment, the input signals are signals, which have been received via separate receive antennas. Alternatively, the receive signals may be obtained by over-sampling. In case of four input signals, the sampling rate is four-times the symbol rate applied in the transmitter.

In 502, the receiver estimates the channels, through which the signals have propagated. Channel estimation may be carried out in the receiver by comparing the received bit-sequence to a known pilot sequence. In a TDMA burst, the pilot, or training sequence, or midamble, is usually placed in the middle of the burst so as to give as good an assessment of the transmit channel as possible on both sides of the pilot.

In 504, the desired signal, such as the user signal, which the receiver is trying to detect, is estimated by using the channel estimates. Then, the desired signal may be reduced from the input signals to produce interference estimate signals.

In 506, the receiver estimates the properties of the interference estimate signals. The estimation may take white noise signals as input signals, and seek to estimate the properties of the interference such that the actual interference estimate signals are the output. The model may be an autoregressive model including two sub-models, a feed-forward sub-model, and a feed-back sub-model. The feed-back sub-model estimates the autoregressive properties of the interference estimate signals. The autoregressive properties may be estimated by estimating each individual channel on its own, and by estimating the channels with respect to each other.

When estimating the channels with respect to each other, samples in a specific channel are analyzed together with samples in neighboring channels that are received during previous moments. The samples in the neighboring channels are thus delayed by one sample from the samples in the specific channel. When the autoregressive properties of the signals have been estimated, the correlation properties of the neighboring input signals may be estimated by applying the feed-forward sub-model.

The feed-back stage was estimated with white-noise assumption, but the feed-forward model takes into account that the separate input signals may be correlated with each other. Therefore, the diagonal unit matrix in the output matrix of the feed-back estimation is replaced by a covariance matrix taking into account the fact that the noise may be colored. The covariance matrix can be estimated by using the obtained autoregressive parameters.

In 508, the obtained parameters may be directly applied to FIR filters. In case of two input signals, the filters may be two-tap filters. A filter is provided for each individual signal branch, and a filter is also provided for each combination of branches.

The cancellation receives the original input signals, and by using these input signals, which also include the desired signal, the interference may be effectively cancelled and the desired signal remains. Thereafter the payload data, that is data other than the pilot in the burst, may be detected.

The disclosed method may be applied over the duration of a burst. It is thus assumed that the interference is time-invariant over a burst and correspondingly, the aim is to whiten the interference over the burst.

The embodiments of the invention may be realized in a radio receiver, such as a base station or mobile phone. The receiver may comprise a controller, which may be conFIG-.ured to perform at least some of the steps described in connection with the flowchart of FIG. 5. The embodiments may be implemented as a computer program comprising instructions for executing a computer process for canceling interference in a radio receiver.

The computer program may be stored on a computer program distribution medium readable by a computer or a processor. The computer program medium may be, for example but not limited to, an electric, magnetic, optical, infrared or semiconductor system, device or transmission medium. The medium may be a computer readable medium, a program storage medium, a record medium, a computer readable memory, a random access memory, and an erasable programmable read-only memory.

Alternatively, the invention may be implemented as application-specific integrated circuit (ASIC) or by logic components.

Even though the invention is described above with reference to an example according to the accompanying drawings, it is clear that the invention is not restricted thereto but it can be modified in several ways within the scope of the appended claims.

The invention claimed is:

1. An apparatus, comprising:
receiving means for receiving at least two input data signals;
extracting means for extracting an interference estimate signal specific to each input data signal;
forming means for forming an interference estimate signal covariance matrix;
estimating means for estimating, from the covariance matrix, autoregressive parameters of each interference estimate signal with regard to itself and to other interference estimate signals, and covariance parameters between interference estimate signals; and
canceling means for canceling interference from the at least two input data signals by finite impulse response filters using the estimated autoregressive and covariance parameters as filter coefficients in the finite impulse response filters.

2. A method, comprising:
receiving at least two input data signals;
extracting an interference estimate signal specific to each input data signal;
forming an interference estimate signal covariance matrix;
estimating, from the covariance matrix, autoregressive parameters of each interference estimate signal with regard to itself and to other interference estimate signals, and covariance parameters between interference signals; and
canceling interference from the at least two input data signals by finite impulse response filters using the estimated autoregressive and covariance parameters as filter coefficients in the finite impulse response filters.

3. A method as claimed in claim 2, further comprising:
providing a finite impulse response filter of the finite impulse response filters to cancel interference from each individual interference estimate signal; and
providing a finite impulse response filter of the finite impulse response filters between each combination of two interference estimate signals to cancel interference between the interference estimate signals.

4. A method as claimed in claim 2, further comprising:
estimating a desired signal; and
reducing the desired signal from each input data signal to obtain an interference estimate signal specific to each input data signal.

5. A method as claimed in claim 2, further comprising:
estimating, by applying an autoregressive model, the autoregressive parameters of each interference estimate signal with regard to itself and to other interference estimate signals simultaneously to the estimation of the covariance parameters between the interference estimate signals.

6. A method as claimed in claim 5, further comprising:
taking, to the autoregressive model, a white noise signal per each interference input data signal as an input signal; and
outputting estimates of the interference estimate signals.

7. A method as claimed in claim 6, further comprising:
providing a feed-forward sub-model in the autoregressive model to provide covariance parameters denoting correlation between the interference estimate signals; and
providing a feed-backward sub-model in the autoregressive model to provide the autoregressive parameters denoting autoregressive parameters per interference estimate signal and between each combination of two interference estimate signals.

8. A method as claimed in claim 2, further comprising:
receiving each of the at least two input data signals via a separate receive antenna.

9. A method as claimed in claim 2, further comprising:
receiving an input signal via a receive antenna; and
oversampling the received input signal into at least two separate input data signals.

10. A computer program embodied on a computer readable medium, the computer program being configured to control a processor to perform:
receiving at least two input data signals;
extracting an interference estimate signal specific to each input data signal;
forming an interference estimate signal covariance matrix;
estimating, from the covariance matrix, autoregressive parameters of each interference estimate signal with regard to itself and to other interference estimate signals, and covariance parameters between interference estimate signals; and canceling interference from the at least two input data signals by finite impulse response filters using the estimated autoregressive and covariance parameters as filter coefficients in the finite impulse response filters.

11. The computer program of claim 10, wherein the computer readable medium includes at least one of the following mediums: a computer readable medium, a program storage medium, a record medium, a computer readable memory, a computer readable software distribution package, and a computer readable compressed software package.

12. An apparatus, comprising:
a receiver configured to receive at least two input data signals;
an extractor configured to extract an interference estimate signal specific to each input data signal;
a first estimator configured to form an interference estimate signal covariance matrix;
a second estimator configured to estimate, from the covariance matrix, autoregressive parameters of each interference estimate signal with regard to itself and to other interference estimate signals, and covariance parameters between the interference estimate signals; and
a canceling unit configured to cancel interference from the at least two input data signals by finite impulse response filters using the estimated autoregressive and covariance parameters as filter coefficients in the finite impulse response filters.

13. The apparatus as claimed in claim 12, wherein a finite impulse response filter of the finite impulse response filters is provided to cancel interference from each individual interference estimate signal, and a finite impulse response filter of the finite impulse response filters is provided between each combination of two interference estimate signals to cancel interference between the interference estimate signals.

14. An The apparatus as claimed in claim 12, wherein the extractor is configured to estimate a desired signal and to reduce the desired signal from each input data signal to obtain an interference estimate signal specific to each input data signal.

15. The apparatus as claimed in claim 12, wherein
the second estimator is configured, by applying an autoregressive model, to estimate the autoregressive parameters of each interference estimate signal with regard to itself and to other interference estimate signals simultaneously to the estimation of the covariance parameters between the interference estimate signals.

16. The apparatus as claimed in claim 15, wherein the autoregressive model takes a white noise signal per each interference input data signal as an input signal, and outputs estimates of the interference estimate signals.

17. The apparatus as claimed in claim 16, wherein the autoregressive model includes a feed-forward sub-model, which is configured to provide the covariance parameters denoting correlation between the interference estimate signals, and a feed-backward sub-model, which is configured to provide the autoregressive parameters denoting autoregressive properties per each single interference estimate signal and between each combination of two interference estimate signals.

18. The apparatus as claimed in claim 12, wherein the receiver comprises at least two receive antennas, each receiving one of the at least two input data signals.

19. The apparatus as claimed in claim 12, wherein the receiver comprises
at least one receive antenna to receive an input signal, and
an oversampling unit configured to oversample the received input signal into at least two separate input data signals.

* * * * *